3,046,272
POLYSACCHARIDE-SULTONE REACTION PRODUCTS

Jan Strating, Groningen, Geert Moes, Hoogezand, and Willem Freerk Vogel, Groningen, Netherlands, assignors to W. A. Scholten's Chemische Fabrieken N.V., Groningen, Netherlands, a corporation of the Netherlands
No Drawing. Filed Nov. 23, 1959, Ser. No. 854,600
Claims priority, application Great Britain Nov. 24, 1958
7 Claims. (Cl. 260—233.3)

It is known in the art that the properties of water soluble polysaccharides may be altered by introduction of certain chemical substituent groups into the polysaccharide molecule.

According to the invention polysaccharide derivatives with exceptional properties are obtained by the conversion of water soluble polysaccharides with sultones in the presence of an alkaline substance.

Sultones are intramolecular cyclic esters of hydroxy-sulphonic acids and may be derived both from aliphatic and from aromatic sulphonic acids. Examples of sultones suitable for the present purpose are 1,3-propanesultone, 1,4-butanesultone, mixtures of isomeric butanesultones (which may be prepared from mixtures of chlorobutanesulphonic acids, obtained by sulfochlorination of 1-chlorobutane), benzylsultone and tolylsultone. The preferred reagents are γ-sultones.

Starch is primarily eligible for use as polysaccharide. The term "starch" when used herein includes both natural starch and modified starches, such as dextrinated, hydrolyzed, oxidized, etherified, esterified or fractionated starch (amylose and amylopectin). The starch may be of any origin; examples are corn starch, wheat starch, potato starch, tapioca starch, waxy corn starch, sago starch or rice starch.

Other polysaccharides suitable for the purpose of the invention are natural plant hydrocolloids such as gum arabic, gum tragacanth, carob gum or guar gum and natural seaweed hydrocolloids such as alginates, as well as the various water soluble modifications and derivatives of these compounds, provided that they contain sufficient hydroxyl groups to react with the sultones.

The sultones may be reacted with the air-dry water-soluble polysaccharides and the product obtained may be used as such without purification or further processing. The water soluble polysaccharides may also be reacted with the sultones in the form of a suspension in a liquid. The product obtained may be filtered, washed and dried, e.g. on a heated rotating cylinder. The sultone may also be reacted with an aqueous dispersion of the polysaccharide and the dispersion of the treated polysaccharide may be dried in known manner, e.g. by passing the same over a heated rotating cylinder whereby removal of water takes place.

The sultone reacts with hydroxyl groups of the water soluble polysaccharide molecule whereby sulphoalkyl or sulphoaryl groups are introduced into the polysaccharide molecule. The polysaccharide ether sulfonic acids and their salts obtained in this way have exceptional properties and they may be advantageously applied in various industries. They may be used e.g. in the textile industry for sizing, printing and finishing operations. In the paper industry they are highly suitable sizing and coating agents. They may also be used as protective colloids, e.g. in oil well drilling muds, and as adhesive or binding agent for various powdered and granular substances and for fibrous materials.

By the introduction of a very small proportion of sulphoalkyl or sulphoaryl groups into the water-soluble polysaccharides the properties thereof with regard to viscosity, clarity and stability are remarkably improved. Moreover the stability of solutions of the new derivatives in water is not adversely affected by a low pH or by polyvalent metal ions.

The method according to the invention has distinct advantages over previously known methods to produce polysaccharide ether sulphonic acids. It provides a very simple and rapid process for the production of low as well as highly substituted polysaccharide ether sulphonic acids, in a substantially pure form, thereby eliminating costly and mostly time-consuming purification methods.

The following examples will illustrate the invention:

Example I

An alkali starch paste is made by mixing and kneading 2000 parts by weight of potato starch, 3000 parts by weight of water and 120 parts by weight of sodium hydroxide at a temperature of 60–70° C. Subsequently 360 parts by weight of γ-propane sultone are added to this paste in the course of about 15 minutes, whereupon the reaction mass is kept at 60–70° C. for 30 minutes. At this time a titration shows that the reaction has been completed. The reaction mass containing the sodium salt of starch propane sulphonic acid is pressed out into thin layers on a heated rotating drum and dried and the dry product is subsequently ground. Analysis of the dry product, which is a substantially pure starch ether, indicates a degree of substitution of 0.27 sulphopropyl groups per anhydroglucose unit.

Example II 160 parts by weight of corn starch are suspended in 200 parts by weight of water in which 32 parts by weight of sodium sulphate have been dissolved. The pH of the suspension is adjusted to 12 with a 2% aqueous sodium hydroxide solution and the temperature of the suspension is raised to 40° C. 11 parts by weight of γ-butanesultone are added to the suspension, the pH during the reaction being maintained at 12 by the addition of 2% aqueous sodium hydroxide solution. After a reaction period of 2 hours the suspension is neutralized with dilute hydrochloric acid and the starch filtered and washed.

The degree of substitution of the corn starch ether is found to be 0.04.

Example III

At a temperature of about 70° C. 61 parts by weight of propane sultone is added dropwise to a mixture of 1000 parts by weight of amylopectin, 1300 parts by weight of water and 20 parts by weight of sodium hydroxide. After a total reaction time of 30 minutes the weakly alkaline reaction mass is dried on a rotating drum at a temperature of 140° C.

The ground product will dissolve in two parts of cold water to produce a viscous, smooth, transparent paste which remains perfectly transparent after storage for a long time.

Example IV

In a kneading apparatus 500 parts by weight of carob bean gum are uniformly mixed with 100 parts by weight of sodium hydroxide and 40 parts by weight of water. 305 parts by weight of propane sultone are slowly added to the mass heated to 50° C. The total reaction time is 2 hours. The sulfopropyl ether of carob bean gum thus obtained having a degree of substitution of 0.55 will dissolve in 10 times the amount of cold water to produce a medium viscous, transparent, smooth paste.

Example V

When repeating Example IV with guar gum instead of carob bean gum a sulfopropyl ether of guar gum is obtained which with 15 times the amount of cold water will dissolve to produce a limpid, smooth paste.

Example VI

To an alkaline mass containing 1000 parts by weight of gum arabic, 900 parts by weight of water and 20 parts by weight of sodium hydroxide 68 parts by weight of a mixture of isomeric butane sultones are added. The mass is allowed to react at a temperature of 65° C. for 90 minutes. The reaction mixture is still weakly alkaline then. It is dried on a rotating drum at 145° C. The ground product when stirred with an equal amount by weight of water produces a perfectly transparent gum solution.

Example VII 100 parts by weight of tapioca starch are suspended in 300 parts by weight of 80% ethanol in which 8 parts by weight of sodium hydroxide have been dissolved. The suspension is heated to 75° C. and in the course of 20 minutes 34 parts by weight of tolyl sultone are added whereupon the mass is allowed to react for 40 minutes at said temperature. The suspension is filtered; the moist starch ether is washed with 75% ethanol and subsequently dried. The dry product obtained is a non-gelatinized starch ether which when stirred with 10 times the amount of cold water produces a smooth, medium-viscous, transparent paste.

We claim:

1. A member of the group consisting of polysaccharide ether sulfonic acid and the alkali metal salts thereof, said polysaccharide ether sulfonic acid consisting essentially of the reaction product of a sultone selected from the group consisting of propane sultone, butane sultone, benzyl sultone and tolyl sultone, and a polysaccharide selected from the group consisting of starch and natural plant hydro-colloids.

2. A member of the group consisting of polysaccharide ether sulfonic acid and the alkali metal salts thereof, said polysaccharide ether sulfonic acid consisting essentially of the reaction product of a sultone selected from the group consisting of propane sultone, butane sultone, benzyl sultone and tolyl sultone, and a polysaccharide selected from the group consisting of starch and natural plant hydro-colloids wherein the polysaccharide moiety, when starch, is ungelatinized.

3. A polysaccharide ether sulfonic acid consisting essentially of the reaction product of propane sultone and starch.

4. A polysaccharide ether sulfonic acid consisting essentially of the reaction product of butane sultone and starch.

5. A polysaccharide ether sulfonic acid consisting essentially of the reaction product of tolyl sultone and starch.

6. A polysaccharide ether sulfonic acid consisting essentially of the reaction product of propane sultone and carob bean gum.

7. A polysaccharide ether sulfonic acid consisting essentially of the reaction product of propane sultone and guar gum.

References Cited in the file of this patent

UNITED STATES PATENTS

| | | |
|---|---|---|
| 2,132,181 | Neugebauer et al. | Oct. 4, 1938 |
| 2,524,400 | Schoene | Oct. 3, 1950 |
| 2,599,620 | Filbert | June 10, 1952 |
| 2,660,577 | Kerr et al. | Nov. 24, 1953 |

FOREIGN PATENTS

| | | |
|---|---|---|
| 525,107 | Canada | May 5, 1956 |

OTHER REFERENCES

Chemical Abstracts, 1956, vol. 50, column 10129–30.